United States Patent [19]
Forde et al.

[11] Patent Number: 5,391,289
[45] Date of Patent: Feb. 21, 1995

[54] FCC PROCESS WITH RAPID SEPARATION OF PRODUCTS

[75] Inventors: Ralph M. Forde, Benicia; Bruce E. Stangeland, Berkeley, both of Calif.

[73] Assignee: Chevron Research and Technology Company, San Francisco, Calif.

[21] Appl. No.: 577,345

[22] Filed: Sep. 4, 1990

[51] Int. Cl.6 ............... C10G 11/00; C10G 35/00; B01D 19/00
[52] U.S. Cl. .................. 208/113; 208/161; 95/271
[58] Field of Search .............. 208/113, 161; 55/196

[56] References Cited

U.S. PATENT DOCUMENTS

| | | | |
|---|---|---|---|
| 4,288,235 | 9/1981 | Gartside et al. | 55/196 |
| 4,318,800 | 3/1982 | Woebcke et al. | 208/127 |
| 4,348,364 | 9/1982 | Gartside et al. | 422/214 |
| 4,433,984 | 2/1984 | Gartside et al. | 55/196 |
| 4,502,947 | 3/1985 | Haddad et al. | 208/161 |
| 4,552,645 | 11/1985 | Gartside et al. | 208/80 |
| 4,556,541 | 12/1985 | Gartside et al. | 422/145 |
| 4,623,446 | 11/1986 | Haddad et al. | 208/113 |
| 4,814,067 | 3/1989 | Gartside et al. | 208/127 |

*Primary Examiner*—Anthony McFarlane
*Assistant Examiner*—Nhat D. Phan

[57] ABSTRACT

A method of fluid catalytic cracking of hydrocarbon feed which for rapid separation of the fluid catalytic cracking catalyst from the mixture of gases and products, utilizes a U-turn inertial separator directly coupled to cyclone separation.

1 Claim, 6 Drawing Sheets

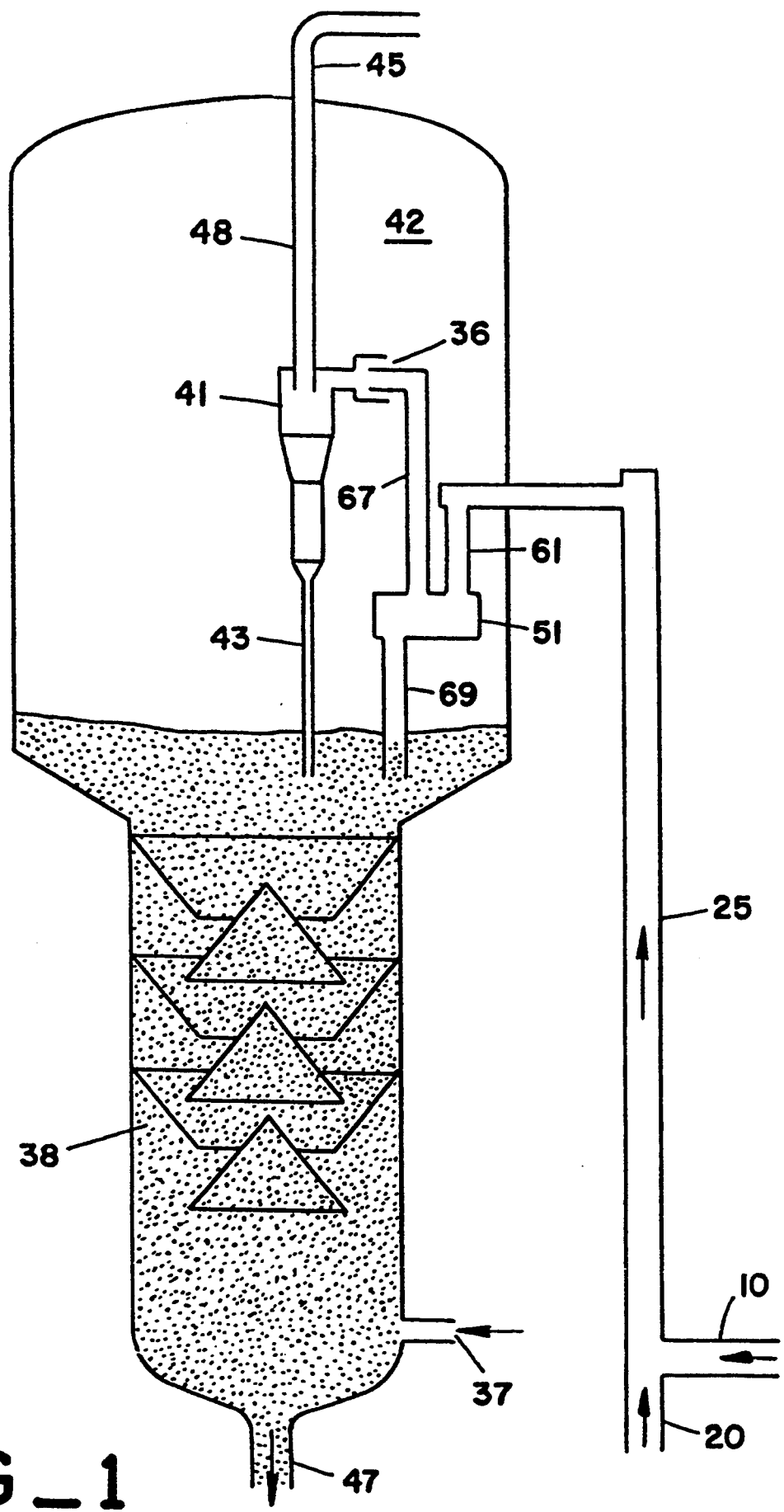
FIG_1

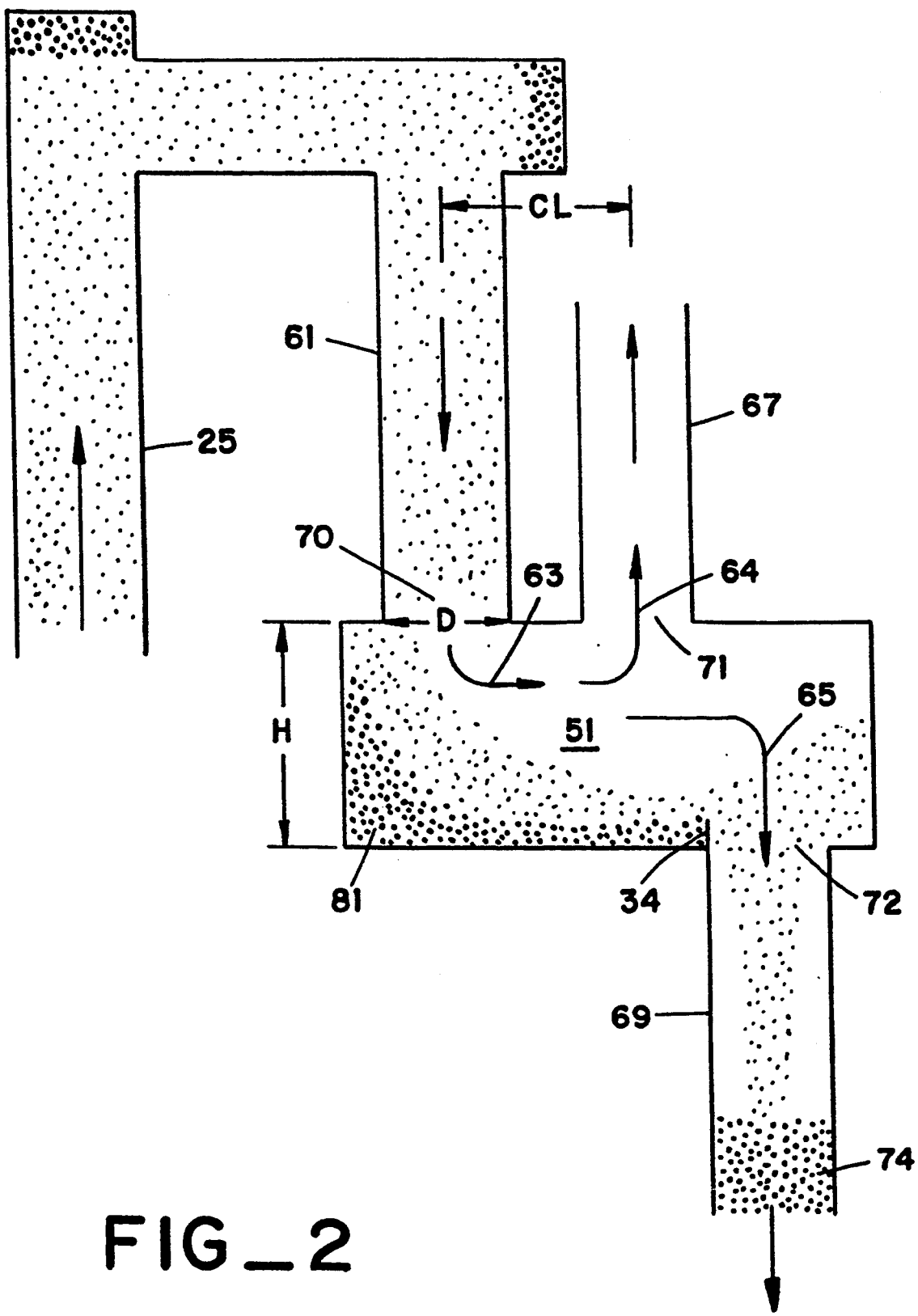
FIG_2

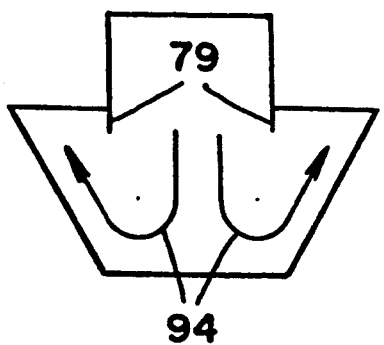
FIG_3A
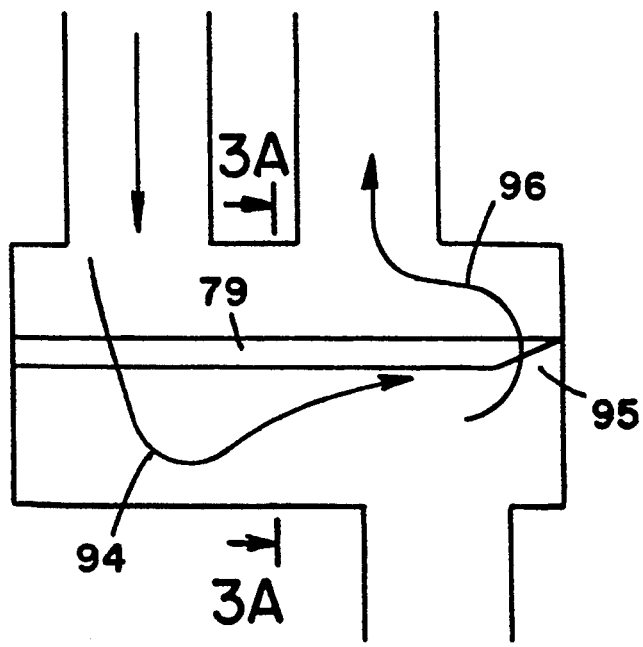
FIG_3B
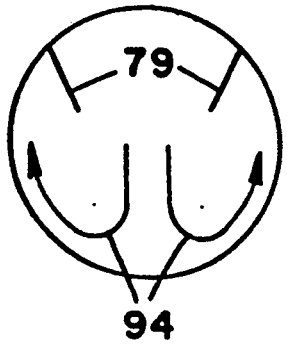
FIG_4A
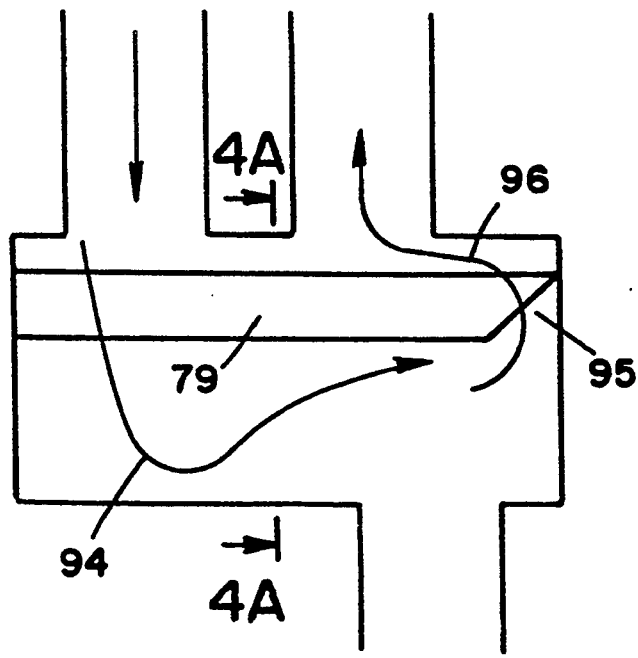
FIG_4B

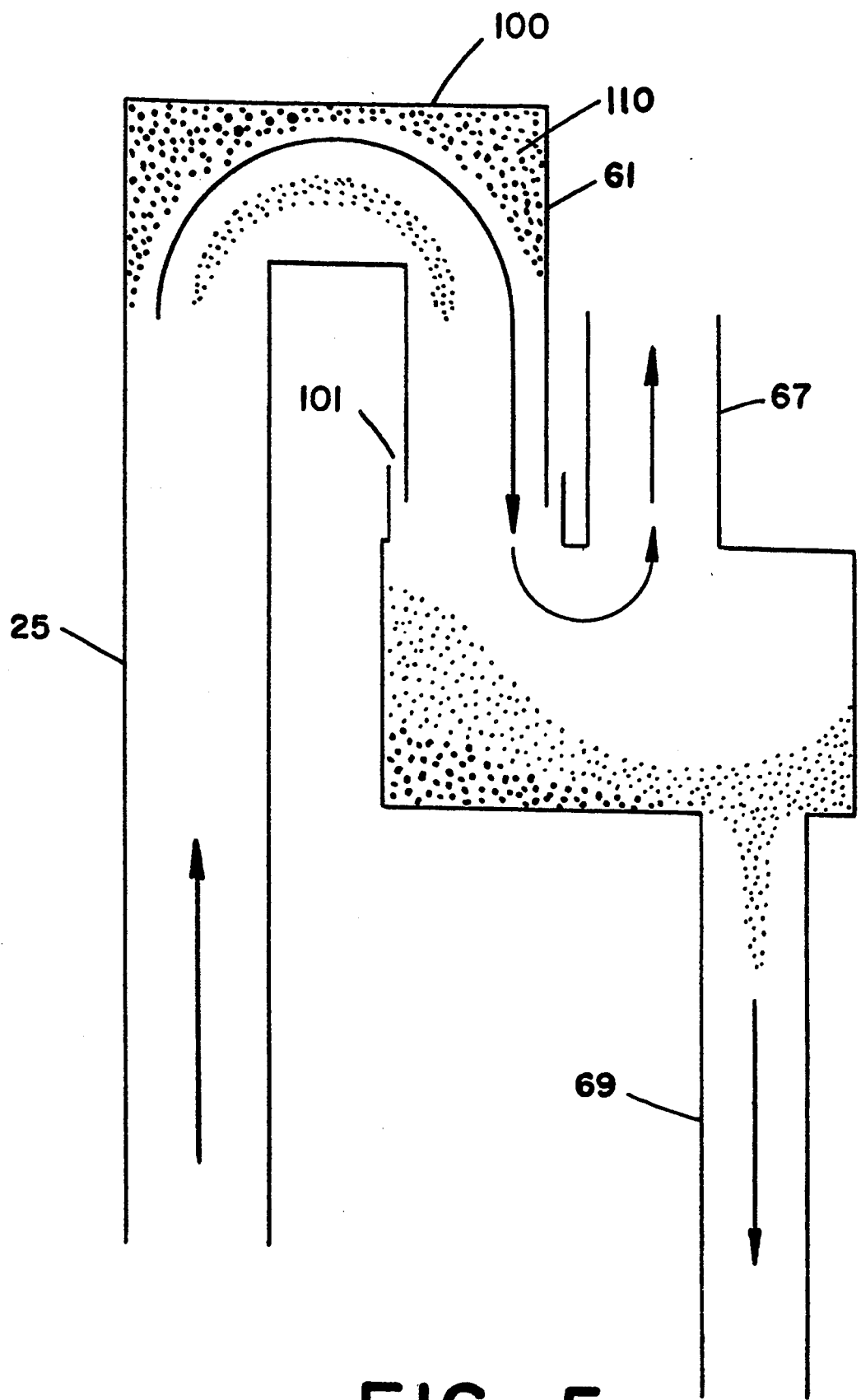
FIG_5

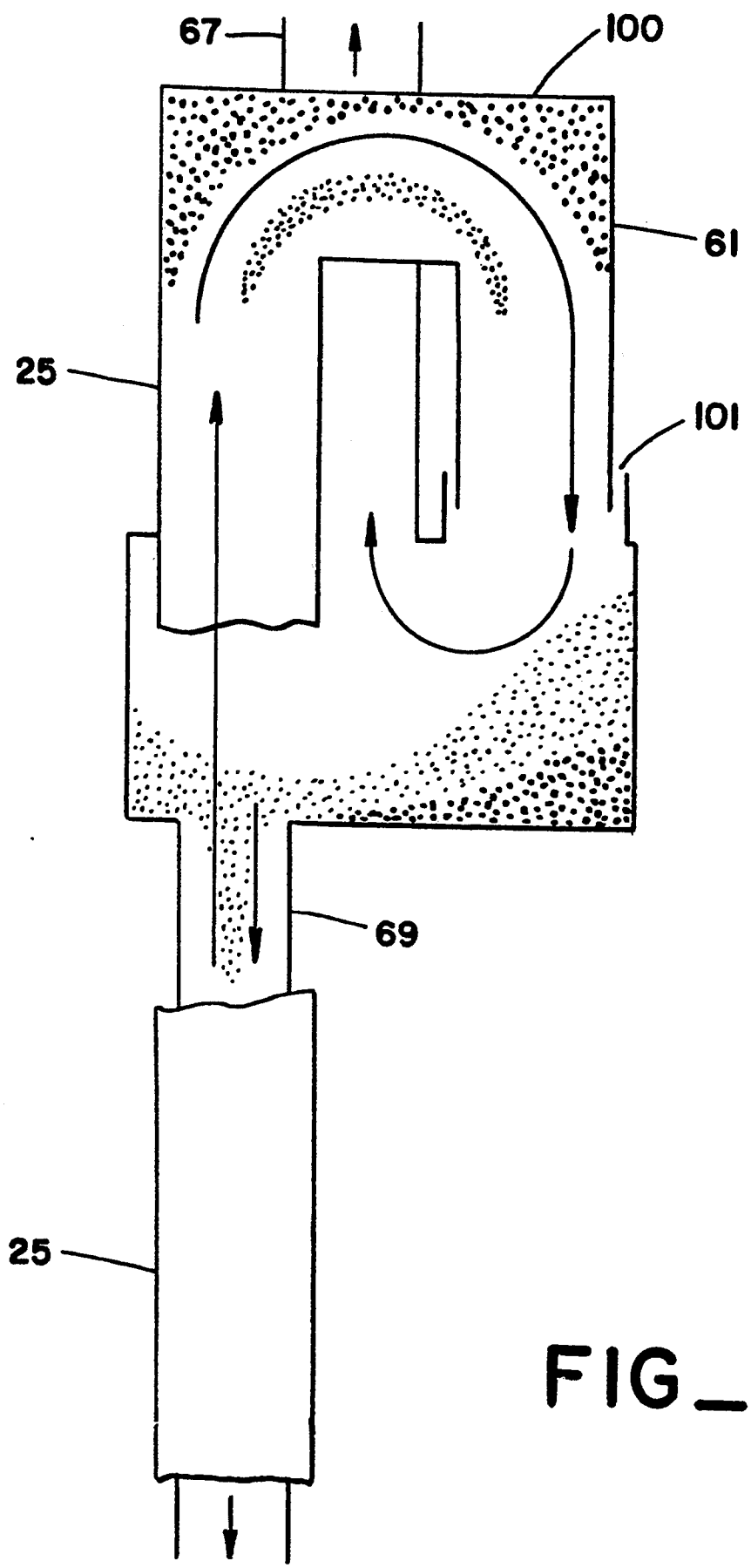
FIG_6

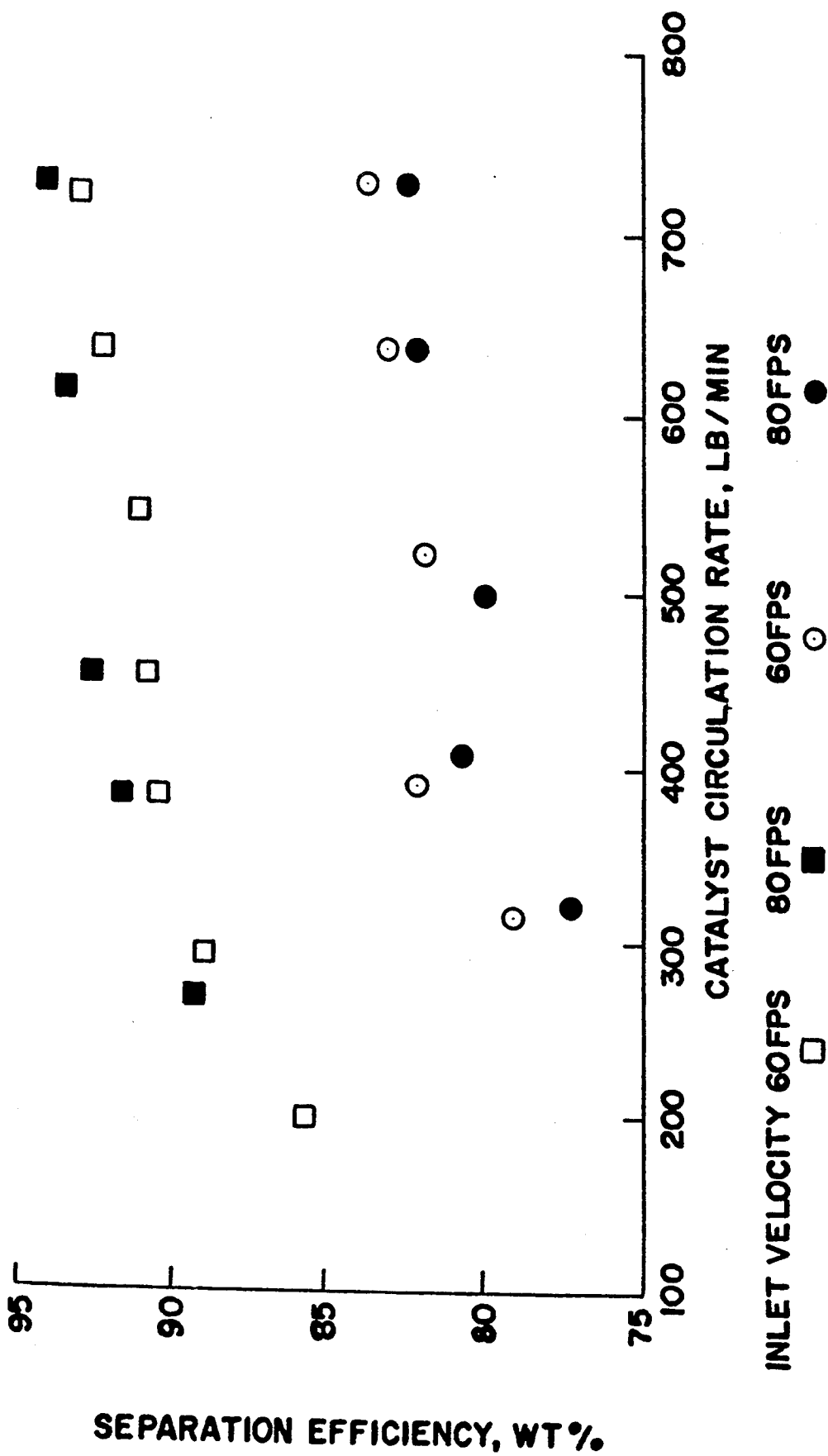

FCC PROCESS WITH RAPID SEPARATION OF PRODUCTS

BACKGROUND OF THE INVENTION

This invention relates to a method of fluidized catalytic cracking. More particularly, it relates to a method of minimizing post-riser cracking in the fluidized catalytic cracking (FCC) of hydrocarbons by increasing the rapidity of separation of the cracked products from the catalyst. It also relates to methods of removing the products from the reactor vessel quickly. In conventional FCC processes, separation of catalyst and reaction products is slow and product residence time in the reactor vessel is long compared with the FCC riser contact time of 1 to 4 seconds. Consequently, a large amount of post-riser cracking occurs, typically leading to 4% or more of non-selective conversion. This invention achieves rapid, efficient separation by means of a U-turn inertial separator.

Fluidized cracking of petroleum fractions is one of the major refining methods to convert crude petroleum oil to useful products such as fuels for internal combustion engines. In such fluidized catalytic cracking, (known popularly as "FCC") high molecular weight hydrocarbon liquids and vapors are contacted with hot, finely divided solid catalyst particles in an elongated riser or transfer line reactor. The transfer line is usually in the form of a riser tube and the contacting time is on the order of a few seconds, say from 0.5 to 8 seconds, and generally not over about 4 seconds. During this short period, catalysts at temperatures in the range from about 1100° F. to 1400° F. are contacted with a hydrocarbon feedstock which is frequently a vacuum gas oil, cycle oil or the like, heated to a temperature of about 300° to 800° F. The reaction is one of essentially instantaneous generation of large volumes of gaseous hydrocarbons. The hydrocarbons and catalyst mixture flows out of the riser tube into a reactor vessel wherein the resultant gaseous hydrocarbons are taken off for distillation into various product fractions defined by boiling ranges. The spent catalyst is then separated in the reactor vessel and stripped of hydrocarbons by passing the catalyst through a stripper section which includes steam flowing up through the down-flowing catalyst usually for a period of 1 to 3 minutes. Catalyst is then returned to a regenerator where residual hydrocarbons, called "coke", on the spent catalyst are burned off by passing a stream of an oxygen-containing gas, such as air, or oxygen-enriched air, through the catalyst until substantially all the carbon is burned from the particles. The heat generated in this regeneration step is used as a heat source to heat the catalyst and thus provide elevated temperatures needed for reaction with the incoming hydrocarbon feed. Regenerated hot catalyst is then recycled to the riser cracking zone wherein the feed is cracked to form more gaseous products.

In recent years, the field of FCC has undergone significant development improvements due primarily to advances in catalyst technology and product distribution obtained therefrom. With the advent of high activity catalysts and particularly crystalline zeolite cracking catalyst, new areas of operating technology have been encountered requiring refinements in processing techniques to take advantage of the high catalyst activity, selectivity and operating sensitivity.

Of particular interest has been the development of methods and systems for separating catalyst particles from a mixed phase containing catalyst particles and gaseous hydrocarbon products, particularly the separation of high activity crystalline zeolite cracking catalyst under more efficient separating conditions so as to reduce the overcracking of hydrocarbon conversion products and promote the recovery of desirable products of the hydrocarbon conversion operation. The separation of catalyst particles from a gaseous mixture is conventionally performed using a cyclone or a series of cyclones contained in the reactor vessel. However existing cyclonic equipment as conventionally used often permits an undesirable extended residence time of the product gases within a large reactor vessel. This extended residence time reduces the value of the product by non-selective thermal or uncontrolled catalytic cracking. Consequently, recent developments in this art are concerned with the rapid separation and recovery of entrained catalyst particles from the mixed phase.

Various processes and mechanical means have been employed heretofore to effect rapid separation of the catalyst from the hydrocarbons at the termination of the riser cracking zone in order to minimize contact time of the catalyst with cracked hydrocarbons.

The use of a simple riser cap over the riser reactor, i.e., in the form of a shroud, is very inefficient for the purpose of reducing product gas residence time. In such designs the reactor vessel is actually being used as an intermediate separator. A vented riser such as that disclosed in U.S. Pat. No. 4,701,307 is an attempt to improve on the limitations of the riser shroud.

U.S. Pat. No. 4,502,947 discloses a process in which a hydrocarbon gas and catalyst mixture passes directly from a riser reactor into a series of cyclone separators, which separate catalyst particles from the mixture and which adds stripping gas to the mixture as it passes from one cyclone separator to the next. Rapid separation is achieved by passing the mixture from the riser directly into a first cyclone through an enclosed conduit, thereby preventing the mixture of catalyst and gaseous products from filling the reactor vessel volume.

The problem of long vapor residence time in the reactor vessel which results in degradation of the product by thermal or uncontrolled catalytic cracking both of which are very non-selective, has been addressed by U.S. Pat. No. 4,502,947 by bypassing the dilute phase entirely. This patent discloses passing the mixture from the riser directly to a riser cyclone separator positioned within the reactor vessel. This can have a very beneficial effect on the yield. In particular, the amount of light gases ($C_2$ and lighter) is greatly reduced. While the production of $C_3$ and $C_4$ gases also decreases, the gasoline production can rise by as much as 1.5% or more. Under these conditions the unit can be run at greater severity, i.e., higher temperature or more active catalysts to increase the production of $C_3$ and $C_4$. The net result is more total liquid of much higher octane and a more valuable product slate. The difficulty with the use of such a rough cut cyclone feeding directly from the riser is that the vertical height of the reactor internals give rise to a relatively short dipleg in the rough cut cyclone. The short dipleg can give rise to catalyst backup and eventual contamination of the fractionator, particularly when an existing reactor has been retrofit with a rough cut cyclone.

Consequently, it would be advantageous if a more compact separator could be configured within the reactor vessel to provide a longer dipleg preventing the danger of solids backup.

Other cyclonic separation methods of the prior art which address the same need for rapid separation of the catalyst phase from the hydrocarbon phase include U.S. Pat. Nos. 4,043,899; 3,661,799; 4,404,495; 4,591,427; 4,725,410; and 4,664,889; 4,295,961; 4,572,780; 4,588,558.

U.S. Pat. No. 4,070,159, provides a separation means whereby the bulk of catalyst solids is discharged directly into a settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from, but near, the discharge end of the riser conversion zone. U.S. Pat. No. 4,219,407, discloses the separation of a catalyst from the gas phase in a fashion which permits effective steam stripping of the catalyst. The suspension of catalyst and gaseous material is discharged from the riser outwardly through radially extending passageways, or arms, which terminate in a downward direction toward catalyst stripping zones. The arms are provided with curved inner surface and confining sidewalls to impart a centrifugally induced concentration of catalyst particles promoting a forced separation from the hydrocarbon vapors. U.S. Pat. No. 4,693,808 discloses an integral hydrocarbon conversion apparatus and process having a downflow hydrocarbon reactor, an upflow riser regenerator, and a horizontal cyclone separator. The horizontal cyclone separator can be equipped with a vortex stabilizer which acts to form a helical flow of vapors from one end of the cyclone separator to the hydrocarbon product outlet end. This vortex acts to separate entrained spent catalyst from the hydrocarbon product material. Other cyclonic means of vapor gas separation employing shrouds have been suggested, such as U.S. Pat. No. 4,591,427 which discloses a riser reactor feeding directly into a cyclone with a separate vapor recovery shroud through which the recovered vapors from the first cyclone are accessible to a cyclone separator. U.S. Pat. No. 4,404,095 minimizes the length of time the cracked vapors are exposed to the catalytic reaction product temperature by discharging the mixture outwardly through an opening in riser into a radial passageway discharging the catalyst particles downward and the separated gases into a cyclone separator.

The difficulty with all cyclonic separators fed directly from a riser, is that they have an inherently long vapor residence time in contact with the catalyst because they rely on helical vortex patterns to separate catalytic particles centrifugally. Indeed, cyclone separators have been sometimes used as gas-solids catalytic and noncatalytic reactors. It would be advantageous if initial separation could be effected by non-cyclonic means.

In connection with other hydrocarbon conversion processes relying upon the contacting of solids and hydro-carbonaceous vapors, inertial separators have been suggested, for example U.S. Pat. No. 4,318,800. This patent discloses a thermal regenerative cracking process. In this process hydrodesulfurized residual oil passes through a thermal cracking zone together with entrained inert hot solids functioning as a heat source and a dilute gas at a temperature between about 1300° F. and 2500° F., and a residence time between about 0.05 to 2 seconds to produce cracked product comprising ethylene and hydrogen.

While the latter patent is not concerned with catalytic processes, nor is it concerned particularly with fluidized bed catalytic cracking, it does disclose in FIG. 16 an interesting inertial separator for the separation of a particulate solid phase from a mixed gaseous-solid phase. The solids used in thermal regenerative cracking (TRC) processes are generally of different bulk density (heavier than FCC catalyst) and different average particle size (larger than FCC catalyst particles). For example, Example 1 of U.S. Pat. No. 4,318,800 discloses the TRC process separation of TRC silica alumina particles having an apparent bulk density of 70 lbs/cu ft. and an average particle size of 100 microns. FCC catalysts typically have an apparent bulk density of 40-50 lbs/cu ft. and a particle size of 50-80 microns diameter. FCC fines, which must also be separated, are even smaller particles. (Apparent bulk density is distinguished from compacted bulk density.) Where the TRC separator was tested with FCC catalyst, the TRC separator was not of FCC reactor scale nor operating conditions (col. 19). The disclosure of U.S. Pat. No. 4,318,800 is incorporated herein by reference.

U.S. Pat. Nos. 4,556,541 and 4,433,984 disclose that the same TRC inertial separator of substantially rectangular cross section provides a separation method and apparatus for essentially complete separation of TRC solids from the mixed phase stream. The prior art states that it is essential that the TRC separator flow path have a rectangular cross section in order to obtain good efficiency, i.e., U.S. Pat. No. 4,433,984 at column 3, line 60. The disclosures of U.S. Pat. Nos. 4,556,541 and 4,433,984 are incorporated herein by reference. Other art which has addressed the problem of TRC solid separation from gases within the context of thermal regenerative cracking include U.S. Pat. Nos. 4,338,187; 4,288,235; 4,348,364; 4,370,303; 4,061,562; 4,097,363; and 4,552,645. The TRC separator of U.S. Pat. No. 4,433,984 is said to be improved by the disclosed separator in U.S. Pat. No. 4,814,067, the improvement comprises a disengagement device modeled on the concepts of U.S. Pat. No. 4,288,235.

U.S. Pat. No. 4,640,201 describes a circulating fluidized bed furnace wherein a non-cyclonic particulate separator is integrally disposed in the gas flow path such that the momentum of the particulate solids and the centrifugal forces acting thereon prevent the solids from sharply turning and cause the solids to continue on their arcuate flow path towards the solids collection means.

U.S. Pat. No. 4,404,095 illustrates a conventional inertial separator. Essentially, the end of the riser makes a 90° turn into a radial passageway and direct fluid communication with the inlet of a cyclone separator. In such a design however, there is low separation efficiency with resulting failure to achieve the desired objective.

SUMMARY OF THE INVENTION

To minimize post-riser cracking, it is essential to separate the gaseous reaction products and the catalyst rapidly and efficiently, and to remove products from the reactor vessel quickly. In conventional FCC, separation is slow and product residence time in the reactor vessel is long compared with the FCC riser contact time of 1 to 4 seconds. Consequently, a large amount of post-riser cracking occurs typically leading to 4% or more of non-selective conversion.

This invention achieves rapid, efficient separation by means of a U-turn inertial separator which is preferably directly connected to a cyclone separator. It eliminates residence of the product vapors in the reactor vessel by attaching the separator vapor outlet directly to the primary cyclones achieving a separation efficiency of 93%, using FCC catalyst at typical FCC vapor loadings and velocities. The residence time inside this type of separator at commercial scale is about 0.1 seconds. Other types of separators described in literature either are much less efficient, cannot be directly connected to the primary cyclone, or take much longer to separate the catalyst.

Another advantage of using the U-turn separator is its smaller size than a rough-cut cyclone, which enables its installation in smaller reactor vessels. In the case of a retrofit to an existing unit (in which vertical space is usually limited), the U-turn separator, being shorter by about 10 feet than a rough-cut cyclone can have a longer dipleg and therefore operate well under start-up and other non-standard conditions. Still another advantage of the present method is the lower erosion achieved in the inertial separator of the present invention because of the protective effect of slumped catalyst in the separator chamber.

Alternative means of using the U-turn inertial separator in FCC comprise direct connection of the separator outlet to the primary cyclone, a partially open connection to permit stripping gas to pass directly into the cyclone, or a completely open connection from the separator outlet directly into the reactor vessel. In the case of direct connection of the inertial separator to the primary cyclone(s) via enclosed conduit(s) it is necessary to provide another entry means into the cyclone(s) for stripping gas and stripped products which continually enter the vessel from the stripping zone. However, the conduit from the separator to the primary cyclone may be an open conduit which permits entry of gases from the vessel into the cyclone. A typical open conduit can be visualized as a loose fitting sleeve over a concentric inlet conduit into the cyclone, such that an annular port is created for entry of gases from the vessel. The annular port is appropriately dimensioned to permit entry of stripping gases in a selected velocity range. In another open conduit embodiment, the annular port is created at the junction of the riser and the separator in the manner just described. The flow velocity and inertia of the effluent from the riser is particularly effective for entraining stripping gas through the annular port. Other embodiments will be described in connection with the figures.

In the method of the present invention fluid catalytic cracking of a hydrocarbon feed comprises the steps of contacting the feed with catalyst particles at elevated temperatures in a riser cracking zone wherein the feed is cracked to form a mixture comprising particles and gaseous cracked products. The mixture from the riser reactor is passed to an inertial separator positioned within the reactor vessel through a conduit. Catalyst particles are separated from the mixture by passing the mixture downwardly through an inlet into the separator chamber wherein the flow path of the mixture changes direction by 90°. The flow path of the gases in the mixture again changes direction by another 90° such that the gases exit the separator chamber upwardly through a first outlet. The flow path of the catalyst particles again changes direction by another 90° exiting the separator chamber downwardly through a second outlet. The catalyst particles then pass downward into a stripping zone containing a fluid bed of catalyst. The second outlet is connected to a dipleg, which is preferably immersed in the stripping zone's fluid bed at its lower end, but which may be fitted with a device designed to regulate the flow of the dipleg's contents. Inside the dipleg, a vertical column of catalyst is created because of the difference in pressure between the separator and the stripping zone, the hydrostatic effects of the fluid bed, and the frictional forces between the downflowing catalyst and the internal walls of the dipleg. The column of catalyst forms a seal which prevents leakage of hydrocarbon vapors through the second outlet. Such leakage would result in the undesirable overcracking of these hydrocarbons by excessive residence time at high temperature inside the stripping zone. In the stripping zone a stripping gas removes hydrocarbons entrained with the catalyst particles, and the catalyst particles are passed from the stripping zone to a regeneration zone. The gases move upwardly through a second conduit to the cyclone separator(s) positioned within the reactor vessel and at least a portion of the stripping gas passes directly into the cyclone(s) as well. The gaseous effluent from cyclone separation is passed to the fractionation zone for the separation of the products.

BRIEF DESCRIPTION OF THE DRAWINGS

FIG. 1 is a schematic diagram of the fluid catalytic cracking method and apparatus of the present invention showing a preferred configuration of the U-turn inertial separator in a fluid catalytic cracking reactor with external riser.

FIG. 2 is a cross-sectional elevational view of the preferred embodiment of the FCC inertial separator.

FIG. 3 is a cutaway view through section 3—3 of embodiments of the FCC inertial separator shown in FIG. 4.

FIG. 4 is a cross-sectional elevational view of other embodiments of the FCC inertial separator.

FIGS. 5 and 6 show cross-sectional elevational views of particular embodiments of the FCC U-turn inertial separator.

FIG. 7 shows the separation efficiency achieved in simulated FCC testing.

DETAILED DESCRIPTION OF PREFERRED EMBODIMENTS OF THE INVENTION

The present invention relates to improvements in a process and an apparatus to separate catalyst particles in a fluid catalytic cracking unit. The separation of catalyst particles from gaseous products which is the subject of this invention is particularly critical in catalytic cracking employing a highly active crystalline zeolite conversion catalyst such as a faujasite "Y" zeolite, mixtures of ZSM-5 zeolite with other catalyst, or other zeolite-containing cracking catalysts. The hydrocarbon conversion operation is performed in a dispersed catalyst phase riser reactor cracking zone of limited or restricted hydrocarbon contact time between the catalyst and the hydrocarbon feed. The catalyst, the temperature, the contact time, and the other parameters of the fluid catalytic cracking process are selected to particularly promote the formation of desired products including gasoline boiling range materials, as well as lighter and higher boiling product materials. Thus, it is contemplated practicing the conversion of gas oil feeds and higher boiling hydrocarbon feeds in a single riser reactor employing outlet temperatures in excess of 900° F. and as high as 1,100° F. In such hydrocarbon conversion operations, the catalyst-hydrocarbon residence time in a riser reaction zone is usually restricted to less than 15 seconds and is desirably restricted, depending on reaction temperature and feed composition, to within the range of from 0.5 to about 8 seconds hydrocarbon residence time. For high temperature operations it is preferred to restrict the hydrocarbon residence time in contact with catalysts to within the range of from about 0.5 to about 4 seconds in order to minimize overcracking of desired products. Short contact times are assured by a rapid separation of the suspension of catalyst particles in gaseous feed and products substantially immediately upon discharge from the riser. Thus, an important aspect of this invention is concerned particularly with an apparatus modification and operating technique or method for obtaining a rapid separation of a hydrocarbon/catalyst mixture discharged from a high temperature riser cracking zone.

The present invention is concerned with an apparatus and method for separating a mixture comprising catalyst particles which is discharged from a riser under conditions which restrictively collect the catalyst particles in a zone separate from the discharged gaseous material, and alter the flow direction of the collected catalyst particles to flow out of contact with the gaseous material as a downwardly confined stream. At the same time, the gaseous products are separated from the mixture in an upwardly flowing stream into the cyclone separator(s) for further separation of residual catalyst particles entrained with the gaseous stream. The collected and confined catalyst particle stream flows downwardly to a catalyst stripping zone out of further contact with discharged hydrocarbon conversion vapors. As the catalyst flows through the stripping zone it cascades over downwardly sloping baffles so as to contact upwardly flowing steam which removes hydrocarbons from the surface and pores of the catalyst and from the interstitial space between the particles. The separated vapors then pass into the inlet of cyclone separating equipment positioned in the upper part of the reactor.

In the practice of the present invention it was found that U-turn inertial separators are surprisingly efficient for the rapid separation of fluid catalytic cracking catalysts from gaseous product mixtures under FCC operating conditions despite the smaller size of FCC catalyst particles and their lower bulk density.

Improved embodiments of the U-turn inertial separator rapidly remove particles from a down-flowing suspension of FCC catalysts with high efficiency. U-turn inertial separators of circular cross section have been determined to have lower efficiency, most likely because of the characteristic secondary flow patterns set up in the separator chamber. Rectangular separators are more efficient but fail to collect those particles which travel upward near the gas outlet. In two improved embodiments of the inertial separator, a chamber of baffled trapezoidal cross section and a chamber of baffled substantially circular cross section have been utilized for improved efficiency over conventional U-turn inertial separators. Both designs minimize secondary flow effects and keep particles away from the vapor outlet. In general, the separator is connected directly to the cyclone, as shown in the figures, or it may discharge into the reactor vessel. The advantages of this invention are higher separation efficiency than conventional separators of this type, and much lower residence time than in a cyclone separator.

Turning now to the Figures, FIG. 1 is a schematic diagram showing the installation of the U-turn inertial separator in a typical fluid catalytic reactor 42. Fresh (i.e., regenerated) catalyst particles 20 are contacted with hydrocarbon feed 10 in a riser reactor cracking zone 25 where the feed is cracked to form a mixture of particles and gaseous products which enters the inertial separator 51 through a first conduit 61. FIG. 2 shows the flow path within the separator in greater detail. The separator 51 comprises a chamber having one inlet 70, a first outlet 71 for gases and a second outlet 72 for catalyst. The first conduit 61 passes the mixture downwardly through an inlet 70 into the separator 51. Within the separator, the flow path of the mixture changes direction by 90° 63. Substantial separation of gases and particles is then achieved by providing a flow path which changes the direction of the gas flow by another 90° 64 so the gases exit the separator upwardly through a first outlet 71 into a second conduit 67 to a cyclone separator 41 positioned within the reactor 42. The catalyst particles, being of much greater density, flow along a path 65 which again changes direction by 90° downwardly and exits the separator 51 through a second outlet 72. The catalyst particles pass downwardly through an elongated dipleg 69 to a stripping zone 38. A column of catalyst 74 builds up inside the dipleg to prevent the passage of hydrocarbon vapor into the stripping zone. In the stripping zone, a stripping gas, preferably steam 37 flows upwardly removing hydrocarbons entrained with the catalyst particles. The catalyst particles pass from the stripping zone 38 to a regeneration zone through conduit 47. Stripping gas passes into the cyclone separator 41 through annular port 36. The gaseous effluent from cyclone separation passes via conduit 48 to a fractionator zone through conduit 45. Catalyst particles from the cyclone pass down the dipleg 43 to the stripping zone 38. Preferably, conduits 61, 67 and or 48 are not completely closed at the junction with the separator or the cyclone, thus permitting the entry of stripping gas into the cyclone, as shown at 36.

The U-turn inertial separator 51 seen in FIG. 2 can be relied on for rapid and discrete separation of cracked product and particulate catalyst discharging from the riser reactor 25. The inlet 70 to the separator 51 is directly above a right angle corner at which a mass of particulate catalyst 81 collect. The gas flow upward through outlet 71 and conduit 67 is oriented 180° from the gas-catalyst flow downward through inlet 70 and conduit 61. The catalyst flow outlet 72 and dipleg conduit 69 is opposed in orientation to the gas flow through outlet 71 and conduit 67, and down-stream from the gas outlet 71. In operation, centrifugal force propels the catalyst particles to the wall opposite inlet 70 of the separator 51 while the gas portion, having less momentum, flows through the vapor space of the chamber 51. Initially, catalyst impinges on the wall opposite the inlet 70 but subsequently accumulates to form a bed of catalyst 81 which ultimately forms a surface having the curvilinear arc of slumped catalyst. Weir 34 is optional. Catalyst impinging upon the bed 81 is moved along the curvilinear arc to the catalyst outlet 72, which is preferably oriented for downflow of catalyst by gravity. The exact shape of the arc is determined by the geometry of the particular separator and the inlet stream parameters such as velocity, mass flow, bulk density, and particle size. Because the force imparted to the incoming catalyst is directed against the static bed 81. rather than the separator 51 itself, erosion is minimal. Separator efficiency, defined as the removal of catalyst from the gas phase leading to outlet 71 is therefore not affected adversely by the high inlet velocities, up to about 100 ft./seconds, and the separator 51 is operable over a wide range of dilute phase densities. Preferably, the separator operates at a dilute phase density of between 0.5 and 2.0 lbs/cu ft. The separator 51 of the present invention achieves efficiencies of about 90% or more, although the preferred embodiment can obtain over 95% removal of catalyst.

It has been found that separator efficiency is dependent upon separator geometry, and contrary to the teachings of the prior art it is not necessary that the flow path be essentially rectangular. However, there remains an optimum relationship between the height and the sharpness of the U-turn in the gas flow.

It has been found that for a given height, H, of chamber 51, efficiency increases as the 180° U-turn in flow path between inlet 70 and outlet 71 is brought progressively closer to inlet 70. Thus, for a given H the efficiency of the separator increases as the flow path decreases and, hence, residence time decreases. Assuming an inside diameter D of inlet 70 the preferred distance CL between the centerlines of inlet 70 and outlet 71 is not greater than 4.0 D, while the most preferred distance between said centerlines is not more than 2.5 D. It is also preferable that the height, H, of the flow path should be at least equal to the value of D. Practice teaches that if H is less than D the incoming stream is apt to disturb the bed of catalyst 81 thereby re-entraining catalyst in the gas product leaving through outlet 72. While not otherwise limited, it is apparent that too large an H eventually merely increases residence time without substantive increases in efficiency. However, account should be taken of the need for surge volume to accommodate variations in catalyst flow due to upsets. The width of the separator chamber 51 is preferably between 0.75 and 2.0 D.

Of course, for separation chambers of approximately circular cross section, the width will be approximately the same as the height, H, of the separation chamber. For separation chambers of trapezoidal cross section, the "width" is an average of the minimum and maximum linear cross section.

Cyclone separation is achieved, as in conventional practice, by the use of several cyclones in parallel and/or in series to effect complete removal of solids. The flow of stripping gas and stripped products into the cyclone separation system is achieved in preferred embodiments by means of first or second conduits which comprise a first conduit portion and a second conduit portion such that said second conduit portion has a larger diameter than said first conduit portion and is spaced therefrom. The spacing between conduit portions creates an annular port through which stripping gas and stripped product flow directly into the separator or the cyclone.

Outlet 71 may be of any inside diameter, however, velocities greater than 200 ft./second can cause erosion because of residual catalyst entrained in the gas. The inside diameter of outlet 72 should be sized so that a pressure deferential between the stripping zone 38 and the separator 51 exists, such that a static height of catalyst is formed in dipleg 69. The static height of catalyst in dipleg 69 forms a positive seal which prevents gases from entering the stripping vessel.

FIG. 3A and 3B show cutaway cross-sectional views of substantially circular and trapezoidal separator chambers along section 3—3 of FIGS. 4A and 4B. The embodiments shown in FIGS. 3-4 provide baffles 79 which serve to prevent the re-entrainment of particulate indicate by flow path 94, or to deflect downward re-entrained and residual particulate. The baffles 79 are longitudinal and connected to the walls of the chamber. The baffles 79 are oriented to inhibit re-entrainment of catalyst. The baffles are preferably truncated at the gas outlet end of the separator, i.e., at 95, to permit the flow of gases 96 around the baffle and out of the separator, thus avoiding excessive turbulence and increasing the efficiency of the separator. Again, the use of such shaped chambers serves to prevent secondary entrainment of particles.

Turning to FIG. 5, we see another embodiment of the U-turn inertial separator which is comparable to FIG. 2. The embodiment of FIG. 5 is characterized by a "sharp bend" in the riser terminus U-turn 100, and by an annular port 101 at the junction of the riser and the inertial separator. The annular port serves to bring in stripping gas from the reaction vessel into the separator, and eventually, the cyclone separation system. The sharp bend configuration is adaptable to an external riser close to reactor vessel 42, and preferably, is used with internal riser reactors. The sharp bend achieves very rapid initial separation of gas and catalyst in the riser's U-turn, reduces turbulence in the separator, reduces upsets in the dipleg 69 by not slugging it with catalyst, and minimizes U-turn erosion by creating a cushioning bed of catalyst 110.

FIG. 6 shows another embodiment of the "sharp bend" U-turn inertial separator in which the separator is "folded back" near to the riser, but is otherwise the same as in FIG. 5. The folded U-turn inertial separator is particularly advantageous for use in internal riser reactor designs, as well as having all the other advantages of the sharp bend separator.

RESULTS

FIG. 7 compares the separation efficiency in operation of the U-turn inertial separator of the present invention with an FCC shrouded riser separator which is believed to be more efficient than a shrouded riser separator of conventional design for FCC operations. Simulated normal FCC operating conditions would be about 625 lbs/min of catalyst circulation. Under these conditions the shrouded riser separator achieves about 83% separation efficiency while the U-turn separator achieves about 93% separation efficiency.

A U-turn separator of the design shown in FIG. 2A was tested with equilibrium FCC catalyst and air under the following conditions:
Temperature: 90° F.
Pressure: 2 psig.
Catalyst flow rate: 200 to 1100 lb/min.
Catalyst loading: 0.37 to 2.09 lb/cu. ft.
Separator inlet velocity: 60 to 80 ft./second The separator dimensions (refer to FIG. 2) were as follows:
Inside diameter of oulet 61 (6 inches); Inside diameter of outlet 67 (5 inches); Inside diameter of dipleg 69 (6 inches); Length of chamber 51 (29 inches); Centerline distance CL (13 inches); Height H (15 inches); and Dipleg 69 length (34 inches).

The test procedure was as follows:

The separator was installed in a vessel containing a fluid bed of catalyst, with a superficial gas velocity of 0.4 to 0.8 ft./second. A suspension of catalyst in air was circulated up a riser and down through the inlet of the separator. The separator discharged most of the catalyst through its dipleg; this catalyst entered the fluid bed, and was recycled to the riser. The remainder of the catalyst stayed in suspension in the air, and left the separator through its gas outlet, which was piped directly to a filter. The separator's carryover rated was determined by measuring the rate of collection of catalyst by the filter. The separation efficiency was calculated as:

$$\frac{(\text{Catalyst flow rate} - \text{carryover rate}) \times 100}{\text{Catalyst flow rate}}$$

It is contemplated that this invention can be practiced in a number of embodiments different from those disclosed without departing from the spirit and scope of the invention. Such embodiments are contemplated as equivalent to those described and claimed herein.

What is claimed is:

1. A method of fluid catalytic cracking a hydrocarbon feed comprises the steps of:
   contacting said feed with catalyst particles at elevated temperatures in a riser cracking zone operationally connected to a reactor vessel, wherein said feed is cracked to form a mixture comprising said particles and gaseous cracked products;
   passing said mixture from said riser to an inertial separator positioned within said reactor vessel through a first conduit oriented in a downward direction;
   separating at least a portion of said catalyst particles from said mixture by passing said mixture from said first conduit in a downward direction through an inlet into said separator wherein the flow path to said mixture changes direction by 90° relative to the flow of said mixture, the flow path of said gaseous cracked products changes direction by an additional 90° relative to the flow of said mixture so that said gaseous cracked products exit said separator upwardly through a first outlet, and the flow path of said catalyst particles changes direction by an additional 90° relative to said downward direction so that said catalyst particles exit said separator downwardly through a second outlet, wherein said separator comprises a chamber of substantially circular cross-section and contains truncated baffles which inhibit the re-entrainment of particles by said gases and the removal of said particles through said first outlet;
   passing said catalyst particles from said second outlet downward to a stripping zone wherein a stripping gas removes hydrocarbons entrained with said catalyst particles, said stripping gas and removed hydrocarbons flowing upwardly from said stripping zone within said reactor;
   passing said gaseous cracked products from said first outlet upwardly through a second conduit into one or more cyclone separators positioned within said reactor vessel, either or both said second conduit and said first conduit is or are in open gaseous communication with said stripping gas and removed hydrocarbons through a port;
   passing at least a portion of said stripping gas and removed hydrocarbons directly into said cyclone;
   passing a gaseous effluent comprising gaseous cracked products, stripping gas and removed hydrocarbons, from said cyclone separator to a fractionation zone; and
   passing said catalyst particles from said stripping zone to a regeneration zone.

* * * * *